United States Patent
Strishock

(10) Patent No.: US 11,594,809 B1
(45) Date of Patent: Feb. 28, 2023

(54) LOW-PIM DUAL PIPE CLAMP FOR CELLULAR BASE STATION ANTENNA SITES

(71) Applicant: ConcealFab, Inc., Colorado Springs, CO (US)

(72) Inventor: Wayne Strishock, Colorado Springs, CO (US)

(73) Assignee: ConcealFab, Inc., Colorado Springs, CO (US)

( * ) Notice: Subject to any disclaimer, the term of this patent is extended or adjusted under 35 U.S.C. 154(b) by 0 days.

(21) Appl. No.: 17/839,555

(22) Filed: Jun. 14, 2022

Related U.S. Application Data

(60) Provisional application No. 63/236,372, filed on Aug. 24, 2021.

(51) Int. Cl.
*H01Q 1/24* (2006.01)
*H01Q 1/22* (2006.01)
(Continued)

(52) U.S. Cl.
CPC .............. *H01Q 1/246* (2013.01); *F16B 2/14* (2013.01); *F16B 7/0493* (2013.01);
(Continued)

(58) Field of Classification Search
CPC ........ H01Q 1/246; H01Q 1/1228; H01Q 1/24; H01Q 1/22; F16B 2/14; F16B 7/0493
(Continued)

(56) References Cited

U.S. PATENT DOCUMENTS

| | | | |
|---|---|---|---|
| 2,101,317 A | 12/1937 | Lemieux | |
| 4,104,642 A * | 8/1978 | Padilla | H01Q 1/1228 343/882 |

(Continued)

FOREIGN PATENT DOCUMENTS

| | | |
|---|---|---|
| CA | 2246986 C | 4/2008 |
| GB | 600385 A | 4/1948 |

(Continued)

OTHER PUBLICATIONS

Admitted prior art.

*Primary Examiner* — Hai V Tran
(74) *Attorney, Agent, or Firm* — Mehrman Law Office; Michael J. Mehrman

(57) ABSTRACT

A low-PIM dual pipe clamp and associated mounting bracket for securing a first pipe transverse to a second pipe at a cellular base station antenna site. The dual pipe clamp accommodates a range of pipe diameters with lower PIM generation, cost, and weight characteristics compared to conventional dual pipe clamps traditionally used at cell sites. The low-PIM dual pipe clamp minimizes the number of parts to upper and lower mounting brackets connected by linear threaded rod connectors, such as bolts, avoiding the use of U-bolts known to create PIM interference in conventional designs. The dual pipe clamp secures first and second pipes against each other in transverse orientations (e.g., horizontal and vertical), as typically utilized to mount antennas at cellular base stations. Each mounting bracket includes first and second pipe restrainers that bias the first and second pipes against each other as the threaded rod connectors are tightened.

20 Claims, 13 Drawing Sheets

(51) Int. Cl.
*F16B 2/14* (2006.01)
*H01Q 1/12* (2006.01)
*F16B 7/04* (2006.01)

(52) U.S. Cl.
CPC ............ *H01Q 1/1228* (2013.01); *H01Q 1/22* (2013.01); *H01Q 1/24* (2013.01)

(58) Field of Classification Search
USPC ..................................................... 343/700 R
See application file for complete search history.

(56) References Cited

U.S. PATENT DOCUMENTS

| | | | |
|---|---|---|---|
| 4,566,819 A | | 1/1986 | Johnston |
| 6,561,473 B1 | | 5/2003 | Ianello |
| 6,768,474 B2 | | 7/2004 | Hunt |
| 6,786,302 B2 | | 9/2004 | Liew et al. |
| 6,937,207 B1 | * | 8/2005 | Sergi .................... F16B 7/0493 |
| | | | 343/878 |
| 7,448,819 B1 | | 11/2008 | Fu |
| 2019/0080826 A1 | | 3/2019 | Kamensek et al. |

FOREIGN PATENT DOCUMENTS

| | | |
|---|---|---|
| JP | 2016204911 A | 12/2016 |
| KR | 20070056757 A | 6/2007 |
| KR | 20080002050 U | 6/2008 |
| KR | 20100045812 A | 5/2010 |
| KR | 200455433 Y1 | 9/2011 |
| KR | 101456778 B1 | 10/2014 |
| KR | 20170111220 A | 10/2017 |

\* cited by examiner

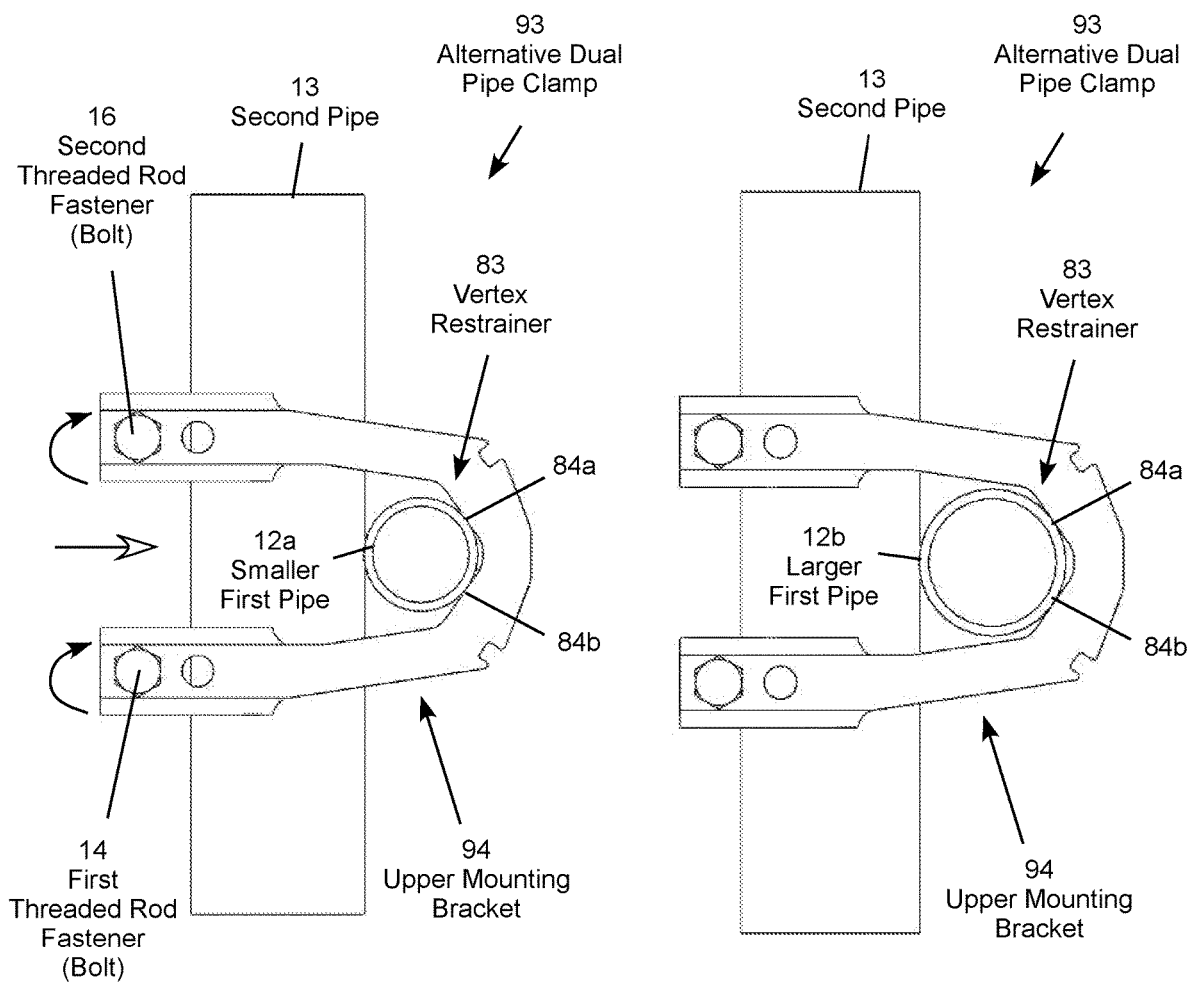
*FIG. 11A*  *FIG. 11B*

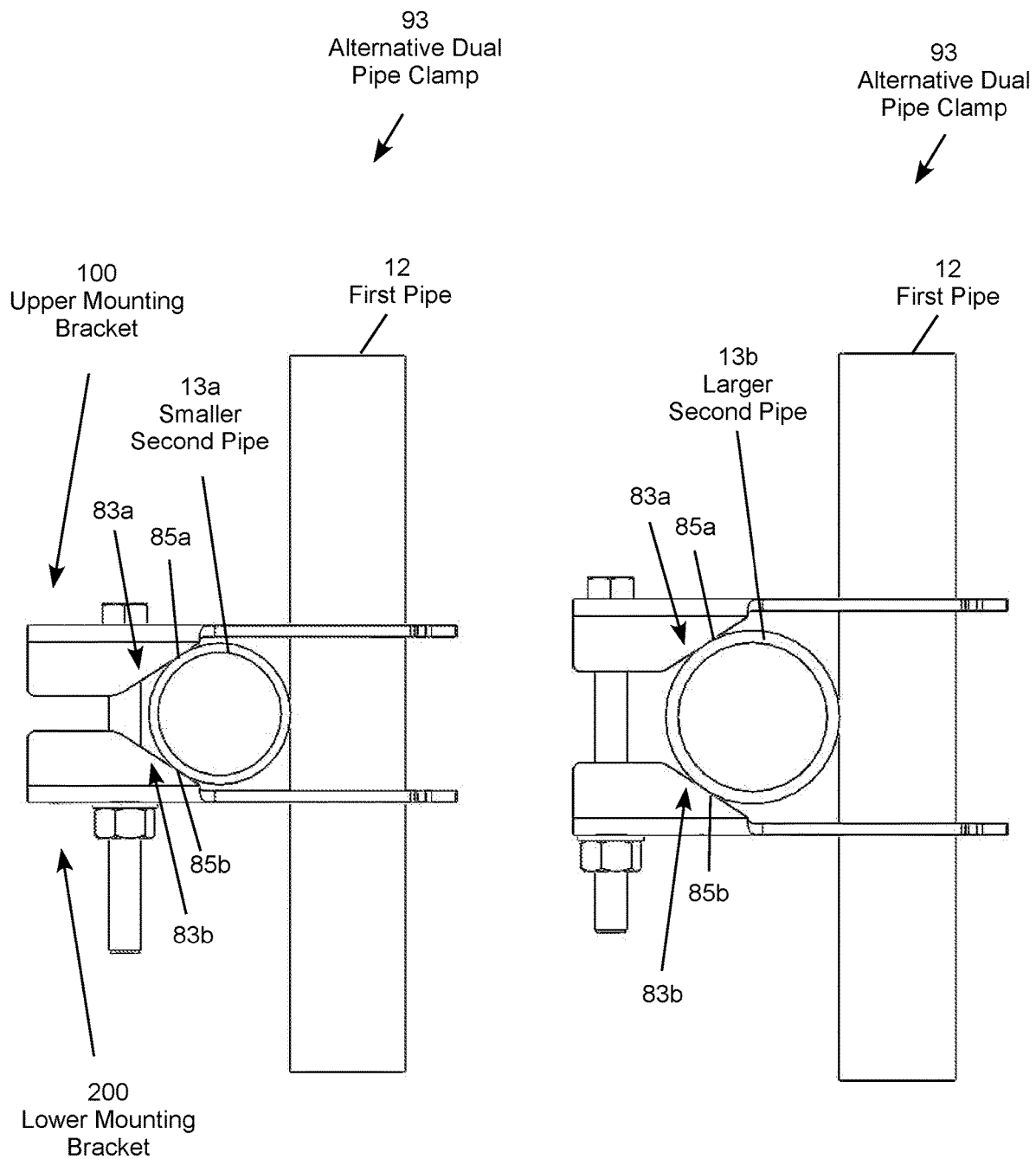
*FIG. 12A*   *FIG. 12B*

LOW-PIM DUAL PIPE CLAMP FOR CELLULAR BASE STATION ANTENNA SITES

REFERENCE TO RELATED APPLICATIONS

This application claims priority to U.S. Provisional Patent Application Ser. No. 63/236,372 filed Aug. 24, 2021, which is incorporated by reference.

TECHNICAL FIELD

The present invention is directed to cellular communication systems and, more particularly, to a low-PIM dual pipe clamp and associated mounting bracket for cellular base station antenna sites.

BACKGROUND

An essential element of modern mobile communications systems is the "cell site." The cell site includes one or more cellular base station antennas aimed at a desired geographical area of coverage. The performance of a cell site is often limited by passive intermodulation ("PIM") interference. PIM interference occurs when the high-power downlink signals (the "main beam") transmitted by the base station antenna mixes at passive, non-linear junctions in the RF path, creating new signals. When these new signals (intermodulation products) fall in an antenna's uplink band, they act as interference and reduce the signal-to-interference-plus-noise ratio ("SINR"). As the SINR reduces, the geographic coverage of the cell site reduces and the data capacity of that cell site reduces.

It is well documented that loosely touching metal-to-metal surfaces can behave in a non-linear fashion and become sources of passive intermodulation when illuminated by high power RF signals. Recently, it has been determined that loose metal-to-metal connections located behind base station antennas are also able to generate high levels of passive intermodulation. Even though this region is well outside the main beam of the antenna, enough RF energy is present in this region to excite non-linear objects and generate PIM.

Conventional dual pipe clamp assemblies used to secure vertical antenna mast pipes to horizontal support frame pipes at cell sites are a common source of loose metal-to-metal contact known to produce PIM. A typical pipe clamp assembly utilizes a mounting plate and four U-bolts. One pair of U-bolts secures a first pipe to the plate and a second pair of U-bolts secures a second pipe to the plate. Due to surface irregularities on the pipe and differences in radius between the pipe and the inside surface of the U-bolt, contact between the U-bolt and the pipe can be inconsistent. When these inconsistent contacts are illuminated by RF energy, PIM can be produced. Additionally, a round U-bolt creates a pocket along the U-bolt where it contacts the pipe that can trap debris. Over time, corrosion can build-up in this pocket creating a second source of passive intermodulation.

A variety of other pipe clamp assemblies have been deployed at cell sites to secure antenna mast pipes to support frame pipes. While many of these pipe clamps are mechanically robust, they are not optimized for low-PIM performance and are often unnecessarily heavy and expensive. A need therefore exists for an improved a low PIM dual pipe clamp for use at cell sites for securing vertical antenna mast pipes to horizontal support frames close to the base station antennas.

SUMMARY

The needs described above are met by a low-PIM dual pipe clamp for securing a first pipe transverse to a second pipe at a cellular base station site. The dual pipe clamp includes an upper mounting bracket with an upper first pipe restrainer and an upper second pipe restrainer, along with a lower mounting bracket with a lower first pipe restrainer and a lower second pipe restrainer. The dual pipe clamp also includes first and second threaded rod fasteners, such as bolts, connecting the upper mounting bracket to the lower mounting bracket. Tightening the first and second threaded rod fasteners causes the upper and lower first pipe restrainers to bias the first pipe against the second pipe, while also causing the upper and lower second pipe restrainers to bias the second pipe against the first pipe. The upper and lower mounting brackets are typically identical to reduce the number of parts to be maintained in inventory.

In illustrative embodiments, the upper and lower first pipe restrainers may have a vertex or arcuate shape for biasing the first pipe against the second pipe. The vertex shape accommodates pipes with a range of diameters, while the arcuate shape is specific to a pipe with a specific diameter. Similarly, the upper and lower second pipe restrainer may have a wedge or arcuate shape. Here again, the wedge shape accommodates pipes with a range of diameters, while the arcuate shape is specific to a pipe with a specific diameter. The first or second pipe restrainers may have other types of edge contact surfaces, such as a serrated edge, a plastic coated edge, a plastic sleeve covering the edge, a low-PIM gasket positioned between the edge contact surface and the pipe, or any other desired edge contact surface.

A mounting bracket for the low-PIM dual pipe clamp includes a shell body and a shell edge around the periphery of the shell body. The shell body has a horseshoe-shape including an inner foot, which is connected to an inner leg, which is connected to an arched section, which is connected to an outer leg, which is connected to an outer foot. The shell edge along the arched section defines a first pipe restrainer for engaging a first pipe. Similarly, the shell edge along the inner foot defines an inner second pipe restrainer transverse to the first pipe restrainer for engaging a second pipe oriented transverse to the first pipe. The shell edge along the outer foot also defines an outer second pipe restrainer transverse to the first pipe restrainer for engaging the second pipe. The narrow contact surfaces at the pipe restrainers defined by the shell edge of the mounting brackets provide well controlled, high-pressure, concentrated edge contact surfaces between the pipe mounting brackets and the pipes being joined, resulting in low PIM performance. This design avoids the relatively long continuous contact surfaces characteristic of U-bolt and other conventional pipe clamps known to produce PIM.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

FIG. 11A is a top view of the alternative dual pipe clamp securing the second pipe to a smaller first pipe.

FIG. 11B is a top view of the alternative dual pipe clamp securing the second pipe to a larger first pipe.

FIG. 12A is a side view of the alternative dual pipe clamp securing a smaller second pipe to a first pipe.

FIG. 12B is a top view of the alternative dual pipe clamp securing a larger second pipe to the first pipe.

DETAILED DESCRIPTION

Figure 1:
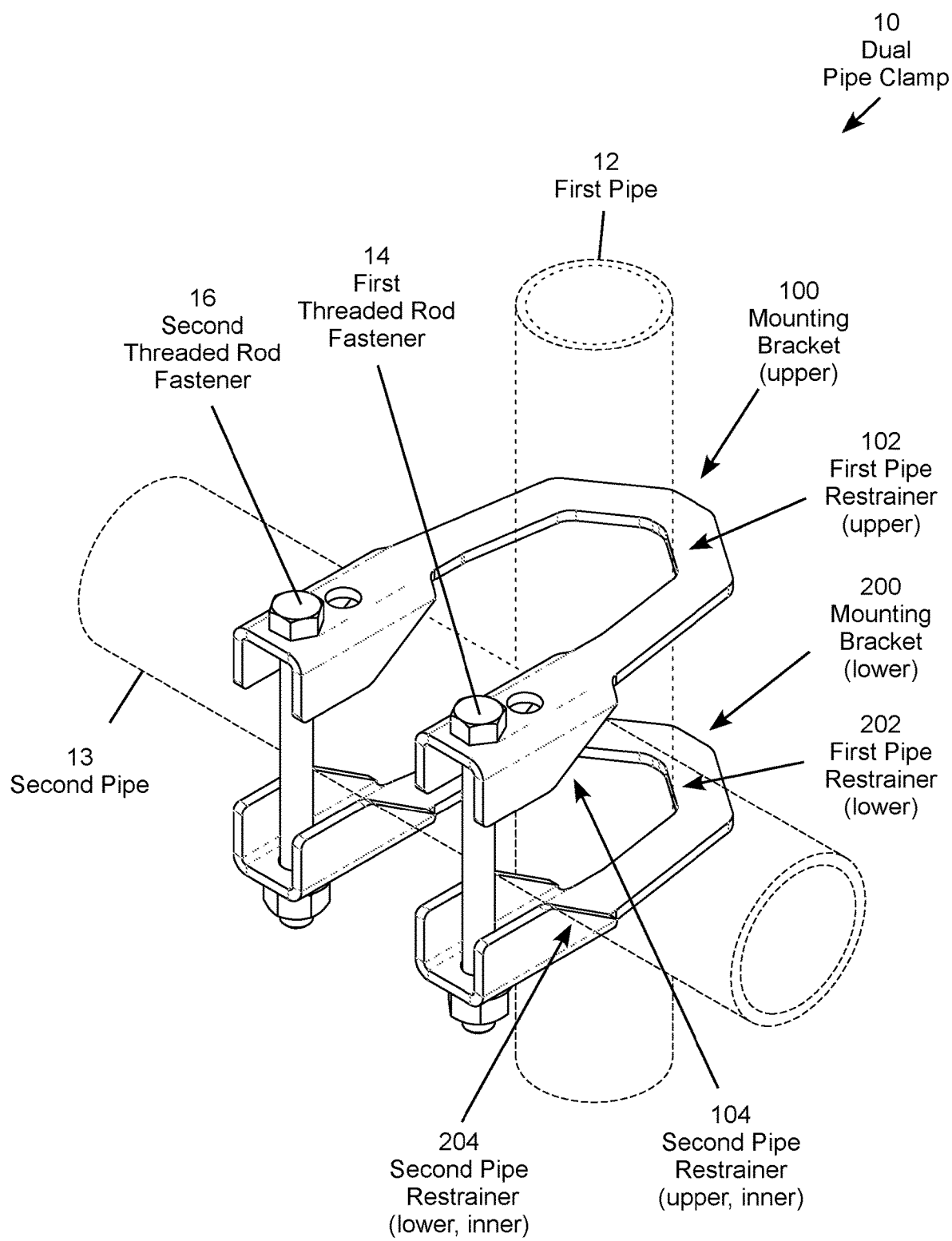
FIG. 1 is a perspective view of a representative dual pipe clamp.

Embodiments of the invention include a dual pipe clamp assembly and an associated mounting bracket. The dual pipe clamp accommodates a range of pipe diameters with lower PIM generation, cost, and weight characteristics compared to conventional dual pipe clamps. The low-PIM dual pipe clamp minimizes the number of parts to upper and lower mounting brackets connected by linear threaded rod connectors, such as bolts, avoiding the use of U-bolts known to create PIM interference in conventional designs. The dual pipe clamp secures first and second pipes against each other in transverse orientations (e.g., horizontal and vertical), as typically utilized to mount antennas at cellular base stations. Each mounting bracket includes first and second pipe restrainers that bias the first and second pipes against each other as the threaded rod connectors are tightened.

Conventional pipe clamp assemblies used to secure vertical antenna mast pipes to horizontal support frame pipes are common sources of loose metal-to-metal contact known to create PIM when located close to base station antennas. Typically, the antenna mast pipe is galvanized Schedule 40 pipe ranging from 1.5-inch to 2.5-inch nominal diameter. Support frame pipes are typically Schedule 40 or Schedule 80 galvanized steel pipe ranging from 2.5-inch to 4-inch nominal diameter. A variety of conventional pipe clamp assemblies have been deployed at cell sites to secure the antenna vertical mast pipes to the horizontal support frame pipes. While mechanically robust, these conventional pipe clamp assemblies are not optimized for low PIM performance and are often unnecessarily heavy and expensive.

For example, a widely deployed traditional pipe clamp assembly utilizes a mounting plate and four U-bolts. One pair of U-bolts secures a first pipe to the plate while a second pair of U-bolts secures a second pipe to the plate transverse to the first pipe. Due to surface irregularities on the pipes and differences in radius between the pipes and the inside surfaces of the U-bolts, contact between the U-bolts and the pipes can be inconsistent. When these inconsistent contacts are illuminated by RF energy, PIM can be produced. Additionally, a round U-bolt creates a pocket where it contacts the pipe that can trap debris. Over time, corrosion products can build-up in this pocket creating a second source of passive intermodulation.

Another issue with this type of pipe clamp assembly is that a unique plate and unique U-bolt sizes are required for each combination of pipe diameters to be joined. Holes on the plate must be located at specific distances for each size U-bolt. Since multiple pipe diameters are often utilized for antenna masts and for support frames, different plates and different U-bolt sizes are required for each connection. As a result, a variety of different pipe clamp assembly part numbers must be purchased and managed to accommodate the many combinations.

Another typical pipe clamp assembly utilizing U-bolts includes a steel channel with arcuate contact surfaces cut into the channel legs. In addition to the U-bolt PIM generation concerns, this type of pipe clamp assembly also has the potential to generate PIM due to inconsistent arcuate contact between the channel legs and the outer surface of the pipe. Multiple unique clamp shapes are also required to accommodate the multiple combinations of pipe diameters leading to many different assemblies that must be managed.

A variation of this design replaces the U-bolts with specifically shaped brackets and threaded rods. This type of pipe clamp assembly can have better PIM performance than assemblies utilizing U-bolts if all mounting hardware is torqued properly. However, over-torquing this type of clamp assembly can deform the specifically shaped brackets resulting in inconsistent contact with the pipes. While this type of pipe clamp assembly can accommodate a wider range of pipe diameters due to the specifically shaped brackets, they are often expensive due to the high parts count and extra time required to assemble.

Another type of pipe clamp utilizes two sets of specifically shaped brackets with the inner two brackets welded together in the center in a 90-degree orientation. This type of clamp assembly can also have improved PIM performance over other conventional assemblies utilizing U-bolts but must also be torqued correctly to prevent deformation of the specifically shaped brackets. This type of pipe clamp assembly can also accommodate a wider range of pipe diameters due the shape of the formed brackets. In many cases, however, this type of pipe clamp assembly is not strong enough to support the side wind loads acting on the cellular base station antenna due to the limited strength of the welded connection.

Conventional dual pipe clamp assemblies are also used for securing scaffolding pipes. Scaffolding is typically installed temporarily then disassembled to move to a different job site. The hardware used to secure this style pipe clamp is retained to the clamp, with hinges allowing the hardware to swing away when loosened without having to fully disassemble the hardware. The hinged joint can be a source of passive intermodulation as can be the arcuate surface contact between the hinged arm and the pipe. Compared to cellular base station antenna sites, scaffolding pipe clamps are typically used to secure much smaller diameter pipes experiencing significantly lower mechanical loads. The combination of poor PIM performance and low strength make this type of pipe clamp inappropriate for securing antenna mast pipes to antenna support frames at cell sites.

The low-PIM dual pipe clamp embodiments of the present invention improve over the conventional designs described above through a mounting bracket formed in generally a "horseshoe" shape including two branches separated by a distance large enough to accommodate a desired maximum first pipe diameter. The closed end of the horseshoe defines a first pipe restrainer, such as a V-shaped "vertex restrainer" including a pair of angled straight edge contact surfaces allowing secure contact with first pipes having a range of diameters up to the desired maximum first pipe diameter. In addition, each branch of the horseshoe includes one or more second pipe restrainers. Each branch of the horseshoe also includes a foot defining a pair of angled straight edge surfaces referred to as "wedge restrainers" formed 90-degrees relative to the vertex restrainer aligned with the major plane of the bracket with mounting holes located between the two angled wedge restrainers. The upper and lower mounting brackets are attached to each other by threaded rod fasteners, such as bolts. Tightening the bolts causes the first pipe restrainers to bias the first pipe against the second pipe, while the second pipe restrainers bias the second pipe against the first pipe. This secures the first pipe transverse to the second pipe (e.g., vertical antenna mast and horizontal frame support pipe) while avoiding the use of U-bolts and other pipe clamp designs known to produce PIM when used in antenna mounts at cellular base station antenna sites.

The pipe mounting bracket can be fabricated from steel strip or other sheet metal using a stamping process. The pipe mounting bracket can also be fabricated using a casting process, if desired. The pipe mounting bracket preferably has a galvanized finish to provide corrosion protection and prevent galvanic mismatch with the galvanized steel antenna mast and support frame pipes. For example, a pipe mounting bracket formed as a horseshoe-shaped steel shell with a thickness of 0.19-inches provides sufficient strength to securely clamp the pipes together and resist mechanical loading experienced by antenna mounts at cell sites.

The pipe mounting bracket may also include a pair of indented features (e.g., grooves) configured to accept an elastomeric retainer. The elastomeric retainer can be used to secure the pipe mounting bracket to the first pipe so that the installer can have "hands-free" to position the second pipe and install compression hardware.

In a representative embodiment, a low passive intermodulation pipe mounting clamp assembly for mounting a pair of pipes transverse to one another includes two identical pipe mounting brackets and two identical sets of compression hardware. Each set of compression hardware typically includes a threaded rod fastener, such as a bolt, two flat washers, a split lock washer, and a nut. For example, compression hardware including half-inch bolts or threaded rods have been found to provide sufficient strength to securely clamp the pipes together and resist mechanical loading experienced by antenna mounts at cell sites. When the compression hardware is torqued, the angled edge surfaces forming the first pipe restrainers (e.g., vertex restrainers) force the first pipe in the direction of the second pipe, while the angled edge surfaces forming second pipe restrainers (e.g., wedge restrainers) apply a normal force biasing the second pipe in the direction of the first pipe, which in turn forces the first pipe into the angled edge surfaces at the closed end of each pipe mounting bracket.

Pipe restrainers utilizing straight edge sections in contact with round pipes accommodate pipes with a range of diameters, while producing well controlled, high-pressure, concentrated edge contact surfaces between the mounting brackets and the round pipes. This configuration also avoids the relatively long continuous contact surfaces characteristic of U-bolt and other conventional pipe restrainers known to produce PIM at cell sites. The galvanized steel finish of the pipe mounting bracket matches the finish on the antenna mast and support frame pipes, eliminating PIM generated by galvanic mismatch. The low-PIM design also avoids the creation of pockets (as exist with U-bolts) able to trap debris, which can enhance corrosion generating PIM.

The low-PIM dual pipe clamp utilizes a single pipe clamp bracket design able to support a range of pipe diameters used in antenna masts and support frames at typical cellular base stations sites. This single bracket can be produced in high volume to reduce cost. The low-PIM dual pipe clamp also utilizes only two sets of standard nuts, bolts and washers to secure the mounting brackets to each other resulting in significantly less hardware than existing designs. Less hardware equates to lower cost, lower weight, and faster assembly time.

Turning to the figures, several illustrative embodiments are described in detail with certain descriptors, including "first" and "second", "upper" and "lower", as well as "inner" and "outer" employed to differentiate similar structures from each other. These descriptors are utilized as a matter of descriptive convenience and are not employed to implicitly limit the dual pipe clamp to any particular position or orientation. Although the representative embodiments attach first and second pipes at 90-degrees to each other (e.g., vertical and horizontal), the relative positions of the edge contact surfaces forming the second pipe restrainers can be tilted with respect to the first pipe restrainers to attach the pipes to each other at a range of transverse angles. While the illustrated embodiments are specifically designed to attach vertical antenna masts to horizontal frame support pipes, the dual pipe camp can be installed in any desired position or orientation with first and second pipes secured to each other at a range of transverse angles.

Figure 2:
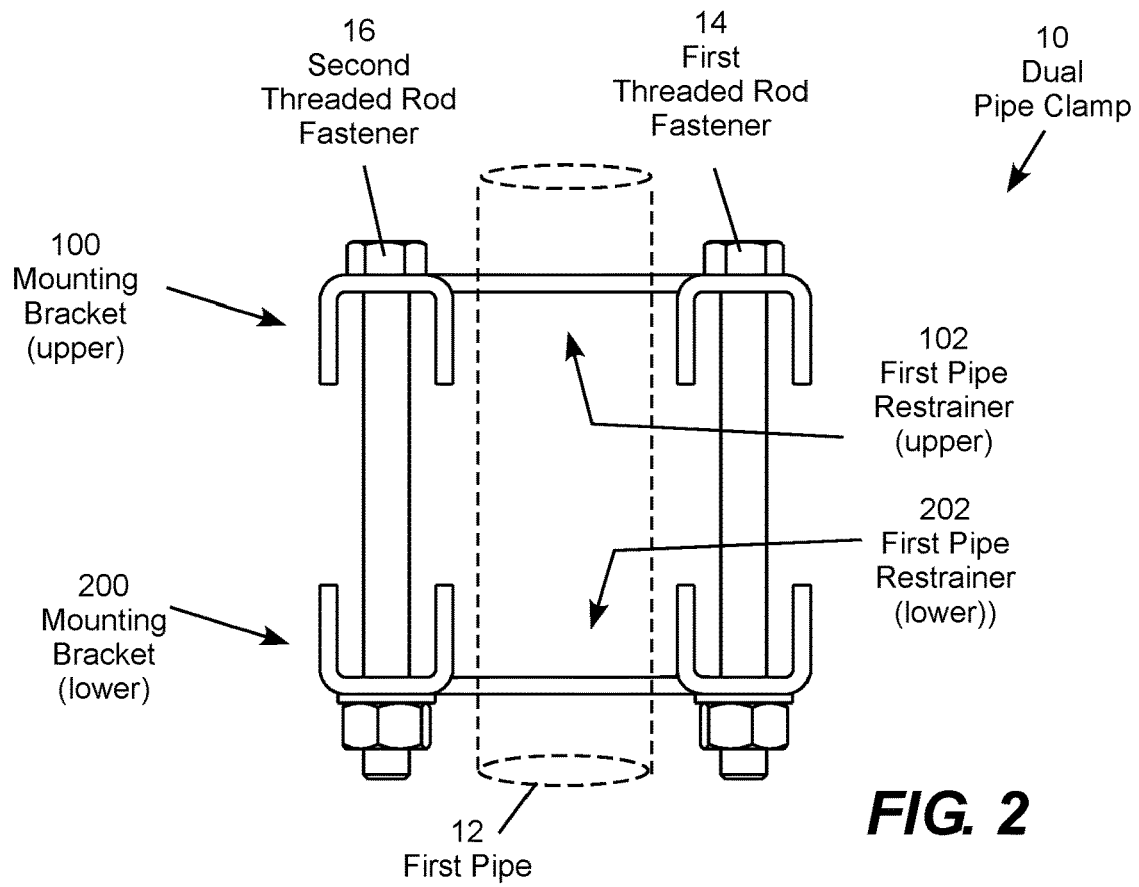
FIG. 2 is an end view of the dual pipe clamp.
Figure 3:
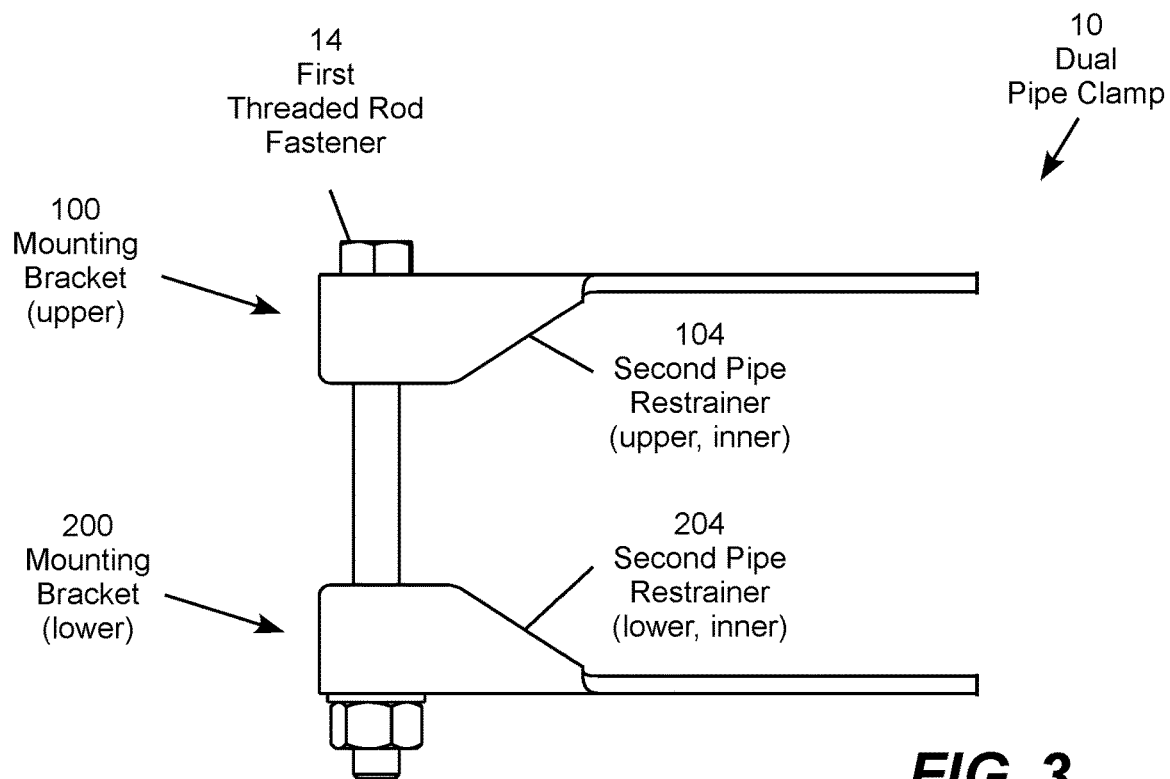
FIG. 3 is a side view of the dual pipe clamp.

FIG. 1 is a perspective view, FIG. 2 is an end view, and FIG. 3 is a side view of a representative dual pipe clamp 10 attaching a first pipe 12 to a second pipe 13. These figures are described as a group to display and identify the enumerated features from different viewpoints. The dual pipe clamp 10 includes first and second threaded rod fastener 14, 16, in this embodiment bolts, connecting a mounting bracket (upper) 100 with a mounting bracket (lower) 200. The mounting bracket (upper) 100 is described in greater detail with reference to FIGS. 4-6, and the mounting bracket (lower) 200 is described in greater detail with reference to FIG. 7. A portion of the features are initially described below with reference to FIGS. 1-3 to point certain aspects of the dual pipe clamp 10 before describing additional details of the mounting brackets with reference to FIGS. 4-7.

The mounting bracket (upper) 100 has a generally horseshoe-shaped shell including a closed end, an inner branch, and an outer branch. The closed end of the horseshoe-shaped shell defines a first pipe restrainer (upper) 102 for engaging the first pipe 12. Similarly, the mounting bracket (lower) 200 includes a horseshoe-shaped shell in which the closed end of the horseshoe-shaped shell defines a first pipe restrainer (lower) 202 for engaging the first pipe 12. In this embodiment, the upper and lower first pipe restrainers 102, 202 are referred to as "vertex restrainers" with a "V" shape creating concentrated edge contacts surfaces defines by the edge of the shell for engaging the first pipe 12. The "V" shape of the vertex restrainers accommodate pipes having a range of diameters, which avoids the need to maintain inventory for a range of different mounting brackets for pipes having different diameters. The vertex restrainers also use straight sections of the shell edge contact with the round first pipe 12 to produce well controlled, high-pressure, concentrated edge contact surfaces with the first pipe resulting in low-PIM performance.

The mounting bracket (upper) 100 also includes a second pipe restrainer (upper, inner) 104, while the mounting bracket (lower) 200 includes a second pipe restrainer (lower, inner) 204, for engaging the second pipe 13. For each mounting bracket, each branch of the horseshoe-shaped shell defines four second pipe restrainers, two on each branch. Although the mounting bracket (upper) 100 includes four upper second pipe restrainers, only one of the second pipe restrainers (upper, inner) 104 is labeled to avoid cluttering the figures. Similarly, although the mounting bracket (lower) 200 includes four lower second pipe restrainers, only one of the second pipe restrainers (lower, inner) 204 is labeled to avoid cluttering the figures. In this embodiment, the second pipe restrainers 104, 204 are each referred to as a "wedge restrainer" with an angled linear shape defined by the edge of the horseshoe-shaped shell, which concentrates the contact surfaces with the second pipe 13. The wedge restrainers accommodate pipes having a range of diameters, which avoids the need to maintain inventory for a range of different mounting brackets for pipes having different diameters. The wedge restrainers also use straight sections of the shell edge in contact with the round second pipe 13 to produce well controlled, high-pressure, edge contact surfaces with the second pipe resulting in low-PIM performance.

Tightening the first and second threaded rod fastener 14, 16 causes the first pipe restrainer (upper) 102 and the first pipe restrainer (lower) 202 to bias the first pipe 12 against the second pipe 13, while the second pipe restrainer (upper, inner) 104 and the second pipe restrainer (lower, inner) 204 bias the second pipe 13 against the first pipe 12. This particular embodiment includes two contact surfaces for the vertex restrainer and four contact surfaces for the four wedge restrainers, for a total of six edge contact surfaces per mounting bracket 100, 200, and twelve edge contact surfaces for the dual pipe clamp 10. Since each mounting bracket defines two edge contact surfaces in contact with the first pipe, and four edge contact surfaces in contact with the second pipe, the dual pipe clamp 10 create a secure, multi-point (twelve-point in this embodiment), low-PIM engagement with the first and second pipes 12, 13. The use of multiple narrow edge contact surfaces defined by the edges of the horseshoe-shaped shells of the upper and lower mounting brackets is a low-PIM feature of the dual pipe clamp 10, which avoids relatively long continuous contact surfaces characteristic U-bolt and other conventional pipe clamps utilized for antenna mounts a cell sites. In addition, the dual pipe clamp 10 forces the first and second pipes 12, 13 against each other as the bolts are tightened, which results in another narrow contact surface between the pipes. These narrow edge contact surfaces produce multiple well controlled, high-pressure, concentrated areas of contact between the mounting brackets and the pipes contributing to the low PIM performance of the dual pipe clamp.

Another feature of the dual pipe clamp 10 is minimization of number of different types of parts required to accommodate a wide range of pipe diameters. The first threaded rod fastener 14 (a bolt in this embodiment) is identical to the second threaded rod fastener 16, while the mounting bracket (upper) 100 is identical to the mounting bracket (lower) 200. As a result, only one type of mounting bracket and one type of threaded rod fastener, in this embodiment a bolt, is required to be carried in inventory to fabricate iterations of the dual pipe clamp 10 accommodating the range of pipe diameters used in antenna mast and support frames at typical cell sites, which minimizes the number of parts required to be carried in inventory. The single type of mounting bracket can be produced in high volume to reduce cost and weight of the dual pipe clamp compared to conventional designs. Each threaded rod fastener may be a standard linear bolt with a fixed head on one end and a removable nut on the other end, or threaded rods with removable nuts on both ends. The threaded rod fasteners also include typical fastener hardware, such as washers, lock washers and nuts. Standard linear bolts or threaded rods are less expensive and weigh less than the U-bolts and other types of pipe restrainers used in many conventional pipe clamps. Half-inch bolts and associated hardware have been found to provide sufficient strength to securely clamp the pipes together and resist mechanical loading experienced by antenna mounts at cell sites.

Referring to the mounting bracket (upper) 100 as a representative mounting bracket, the first pipe restrainer (upper) 102 is oriented transverse to the second pipe restrainer (upper, inner) 104. As the enumerated second pipe restrainer (upper, inner) 104 represents four similar second pipe restrainers defined by the mounting bracket (upper) 100, this embodiment of the mounting includes four 90-degree bends lending strength and rigidity to the horseshoe-shaped shell forming the mounting bracket. This allows the mounting bracket to be formed from relatively thin, light weight sheet metal or casting while obtaining the desired strength and rigidity characteristics. For example, a horseshoe-shaped shell formed from 0.19-inch thick steel sheet metal or casting has been found to provide sufficient strength to securely clamp the pipes together and resist mechanical loading experienced by antenna mounts at cell sites. The pipe mounting bracket may be stamped from sheet metal or cast into the desired shape and preferably has a galvanized finish to provide corrosion protection and prevent galvanic mismatch with the galvanized steel antenna mast and support frame pipes. This embodiment produces low-PIM performance with lower cost and weight compared to conventional dual pipe clamp assemblies utilized to support antennas at cell sites.

Figure 4:
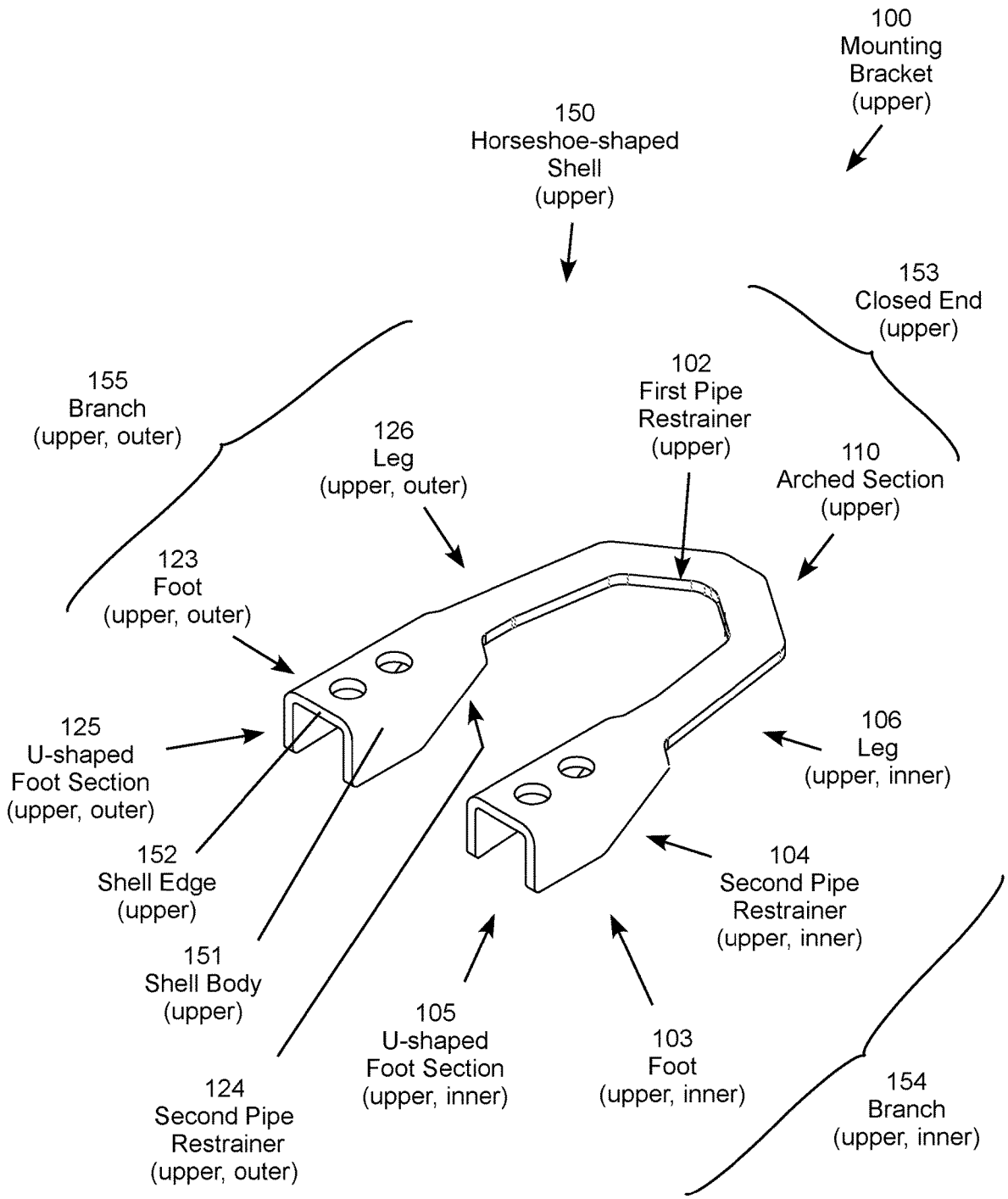
FIG. 4 is a perspective view of an upper mounting bracket of the dual pipe clamp.
Figure 5:
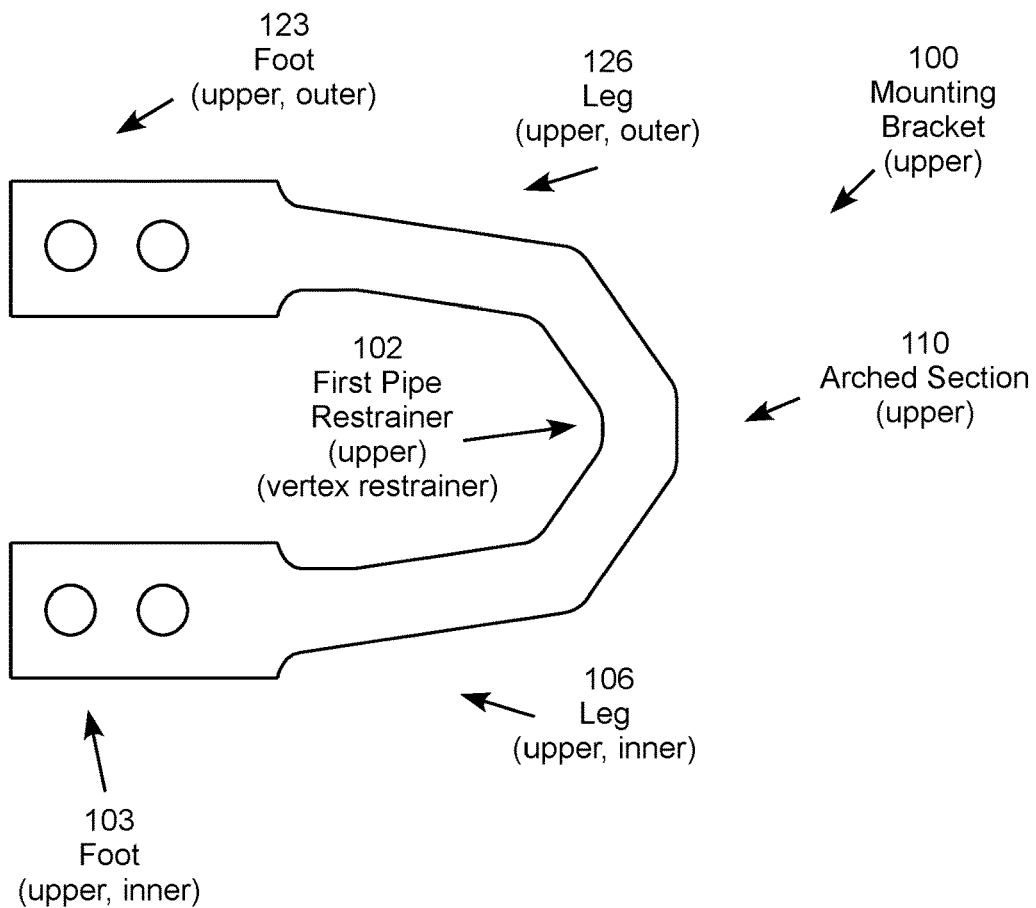
FIG. 5 is a top view of the upper mounting bracket.
Figure 6:
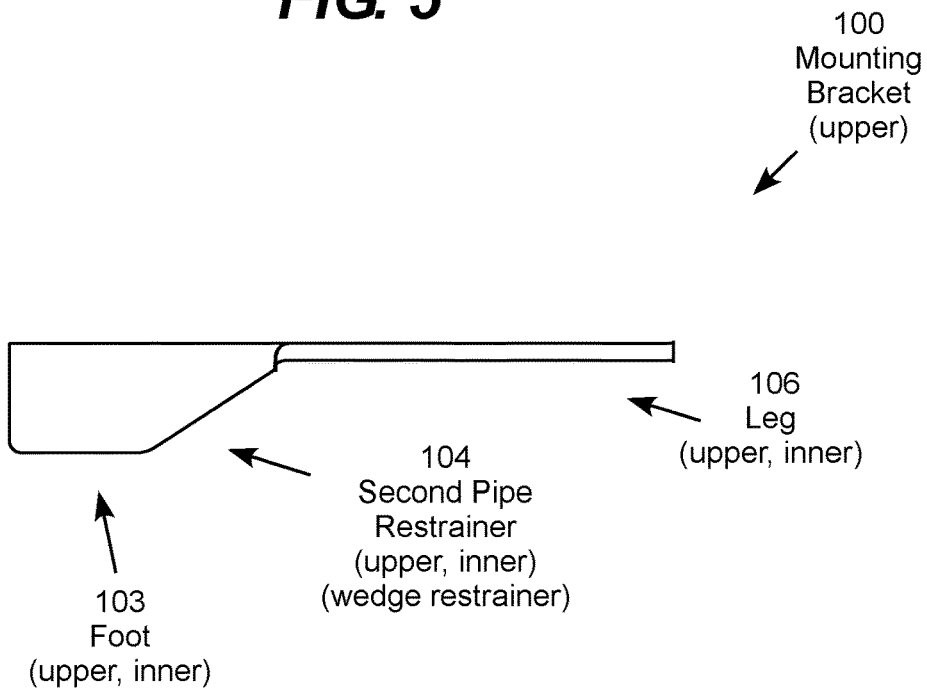
FIG. 6 is a side view of the upper mounting bracket.

FIG. 4 is a perspective view, FIG. 5 is a top view, and FIG. 6 is a side view of the mounting bracket (upper) 100 of the dual pipe clamp 10. These figures are described as a group to display and identify the enumerated features from different viewpoints. While the first pipe restrainer (upper) 102 and the second pipe restrainer (upper, inner) 104 are described above with reference to FIGS. 1-3, additional features are labeled on FIG. 4-6. The mounting bracket (upper) 100 has a generally horseshoe-shaped shell 150 including a shell body (upper) 151 surrounded around its periphery by a narrow shell edge (upper) 152. The horseshoe-shaped shell (upper) 150 defines a closed end (upper) 153 connecting one branch (upper, inner) 154 with another branch (upper, outer) 155, creating the general horseshoe shape. The branch (upper, inner) 154 includes a foot (upper, inner) 103 including a U-shaped foot section (upper, inner) 105 that defines the second pipe restrainer (upper, inner) 104. Similarly, the branch (upper, outer) 155 includes a foot (upper, outer) 123 including a U-shaped foot section (upper, outer) 125 that defines the second pipe restrainer (upper, outer) 124.

An arched section (upper) 110 joins the leg 106 (upper, inner) with the leg 126 (upper, outer) to form the horseshoe shape of the mounting bracket (upper) 100. The foot (upper, inner) 103 is connected to the leg (upper, inner) 106, which extends to the arched section (upper) 110, which forms the closed end of the horseshoe shape of the mounting bracket (upper) 100. Similarly, the foot (upper, outer) 123 is connected to a leg (upper, outer) 126, which extends to the arched section (upper) 110. The arched section (upper) 110 forms the first pipe restrainer (upper) 102, the foot (upper, inner) 103 forms the second pipe restrainer (upper, inner) 104, and the foot (upper, outer) 123 forms the second pipe restrainer (upper, outer) 124. The first pipe restrainer (upper) 102 is oriented transverse to the second pipe restrainer (upper, inner) 104, which requires a bend in the shell 150 lending strength to the mounting bracket (upper) 100. The second pipe restrainer (upper, inner) 104 represents two edge contact surfaces formed by the U-shaped foot section (upper, inner) 105, while the second pipe restrainer (upper, outer) 124 represents two edge contact surfaces formed by the U-shaped foot section (upper, outer) 125. As a result, the horseshoe-shaped shell 150 includes four 90-degree bends lending strength the mounting bracket (upper) 100.

The horseshoe-shaped shell (upper) 150 includes the shell body (upper) 151 surrounded by a shell edge (upper) 152 around the periphery of the shell body defining the edge contacts surfaces for contacting the pipes. The shell body (upper) 151 forms the inner and outer feet (upper) 103, 123, the inner and outer legs (upper) 106, 126, and the arched section (upper) 110. The shell edge 152 forms the first pipe restrainer (upper) 102 as well as the four second pipe restrainers represented by the second pipe restrainer (upper, inner) 104 and the second pipe restrainer (upper, outer) 124 labeled in FIG. 4. The first pipe restrainer (upper) 102 is a V-shaped "vertex restrainer" including straight sections of the narrow shell edge 152 for contacting the round first pipe 12. The second pipe restrainer (upper, inner) 104 and the second pipe restrainer (upper, outer) 124 are "wedge restrainers" including straight sections of the narrow shell edge 152 for contacting with round second pipe 13. The use of straight sections of the narrow shell edge 152 for contacting the round pipes accommodates pipes with a range of diameters, while producing well controlled, high-pressure, concentrated edge contact surfaces between the mounting brackets and the pipes. This configuration also avoids the relatively long continuous contact surfaces characteristic U-bolt and other conventional pipe restrainers.

Figure 7:
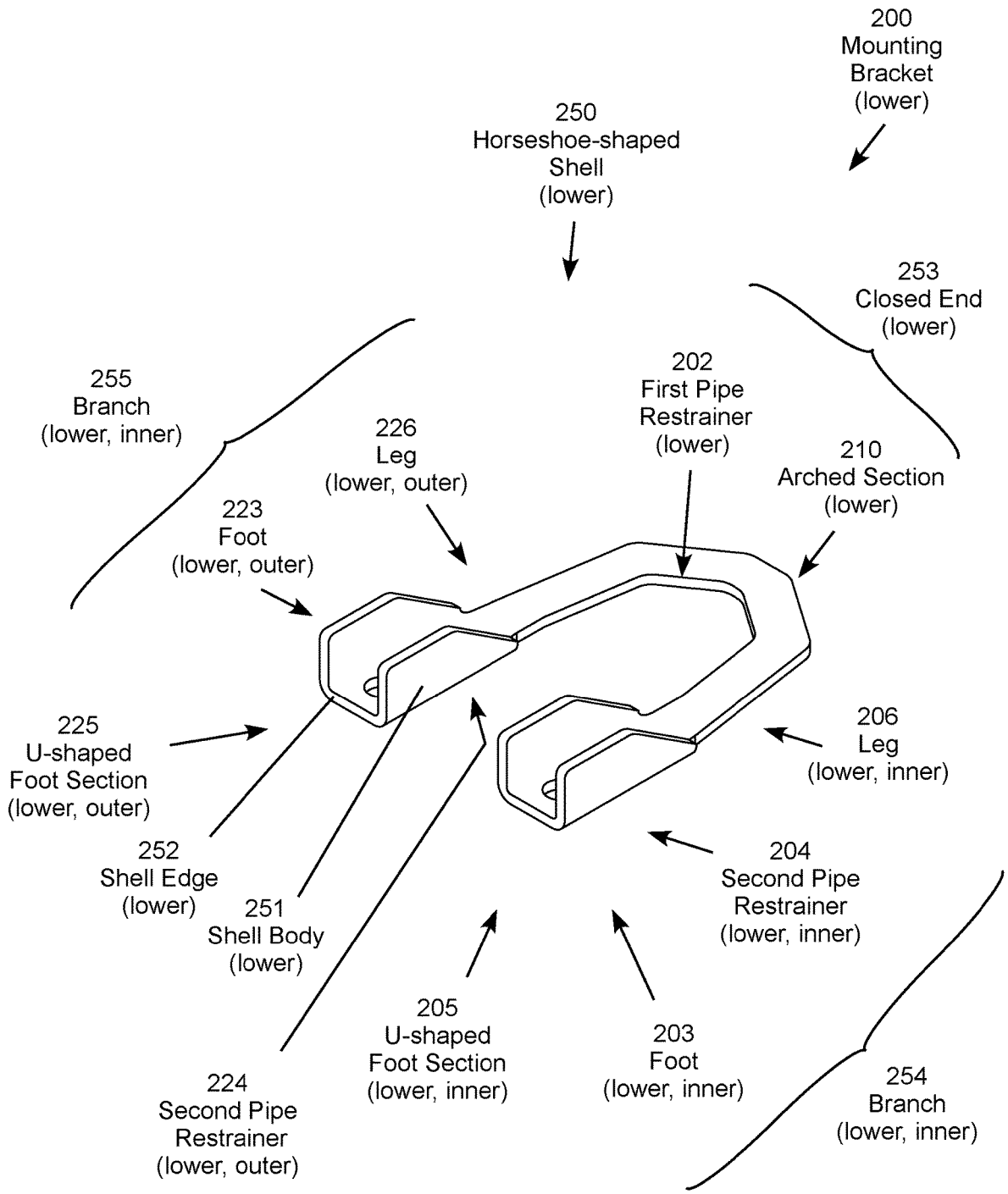
FIG. 7 is a perspective view of a lower mounting bracket of the dual pipe clamp.

FIG. 7 is a perspective view of the mounting bracket (lower) 200 of the dual pipe clamp 10, which is identical to the mounting bracket (upper) 100, but described in detail to complete the part naming convention. The mounting bracket (lower) 200 has a generally horseshoe-shaped shell 250 including a shell body (lower) 251 surrounded around its periphery by a narrow shell edge (lower) 252. The horseshoe-shaped shell (lower) 250 defines a closed end (lower) 253 connecting a branch (lower, inner) 254 with a branch (lower, outer) 255, creating the general horseshoe shape. The branch (lower, inner) 254 includes a foot (lower, inner) 203 including a U-shaped foot section (lower, inner) 205 that defines the second pipe restrainer (lower, inner) 204. Similarly, the branch (lower, outer) 255 includes a foot (lower, outer) 223 including a U-shaped foot section (lower, outer) 225 that defines the second pipe restrainer (lower, outer) 224.

An arched section (lower) 210 joins the leg 206 (lower, inner) with the leg 226 (lower, outer) to form the horseshoe shape of the mounting bracket (lower) 200. The foot (lower, inner) 203 is connected to the leg (lower, inner) 206, which extends to the arched section (lower) 210, which forms the closed end of the horseshoe shape of the mounting bracket (lower) 200. Similarly, the foot (lower, outer) 223 is connected to a leg (lower, outer) 226, which extends to the arched section (lower) 210. The arched section (lower) 210 forms the first pipe restrainer (lower) 202, the foot (lower, inner) 203 forms the second pipe restrainer (lower, inner) 204, and the foot (lower, outer) 223 forms the second pipe restrainer (lower, outer) 224. The first pipe restrainer (lower) 202 is oriented transverse to the second pipe restrainer (lower, inner) 204, which requires a bend in the shell 250 lending strength to the mounting bracket (lower) 200. The second pipe restrainer (lower, inner) 204 represents two edge contact surfaces formed by the U-shaped foot section (lower, inner) 205, while the second pipe restrainer (lower, outer) 224 represents two edge contact surfaces formed by the U-shaped foot section (lower, outer) 225. As a result, the horseshoe-shaped shell 250 includes four 90-degree bends lending strength the mounting bracket (lower) 200.

The horseshoe-shaped shell (lower) 250 includes the shell body (lower) 251 surrounded by a shell edge (lower) 252 around the periphery of the shell body defining the edge contacts surfaces for contacting the pipes. The shell body (lower) 251 forms the inner and outer feet (lower) 203, 223, the inner and outer legs (lower) 206, 226, and the arched section (lower) 210. The shell edge 252 forms the first pipe restrainer (lower) 202 as well as the four second pipe restrainers represented by the second pipe restrainer (lower, inner) 204 and the second pipe restrainer (lower, outer) 224 labeled in FIG. 7. The first pipe restrainer (lower) 202 is a V-shaped "vertex restrainer" including straight sections of the narrow shell edge 252 for contacting the round first pipe 12. The second pipe restrainer (lower, inner) 204 and the second pipe restrainer (lower, outer) 224 are "wedge restrainers" including straight sections of the narrow shell edge 252 for contacting with round second pipe 13. The use of straight sections of the narrow shell edge 252 for contacting the round pipes accommodates pipes with a range of diameters, while producing well controlled, high-pressure, concentrated edge contact surfaces between the mounting brackets and the pipes. This configuration also avoids the relatively long continuous contact surfaces characteristic U-bolt and other conventional pipe restrainers.

Figure 8A:
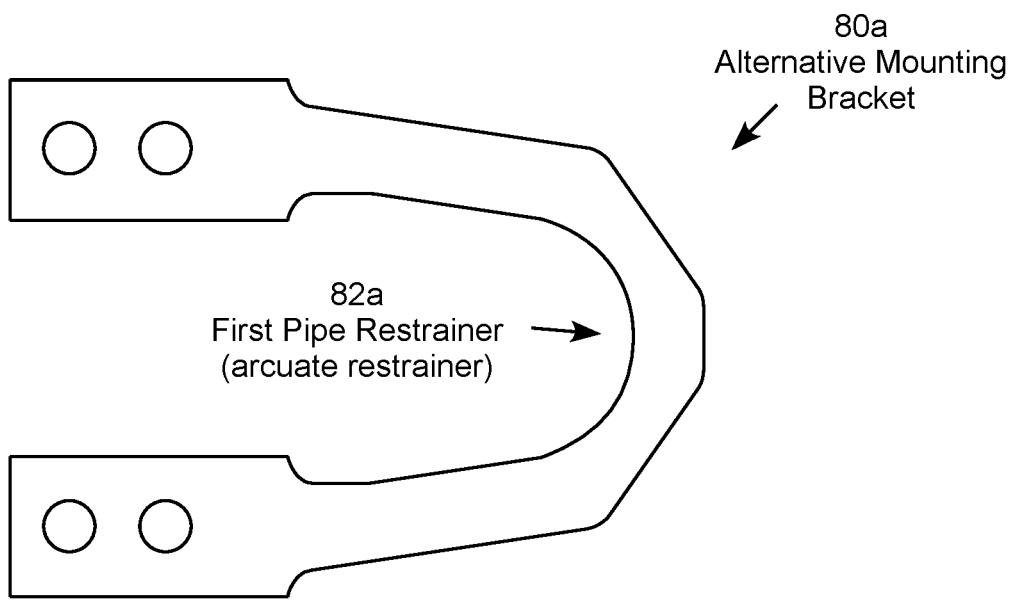
FIG. 8A is a top view of an alternative mounting bracket.
Figure 8B:
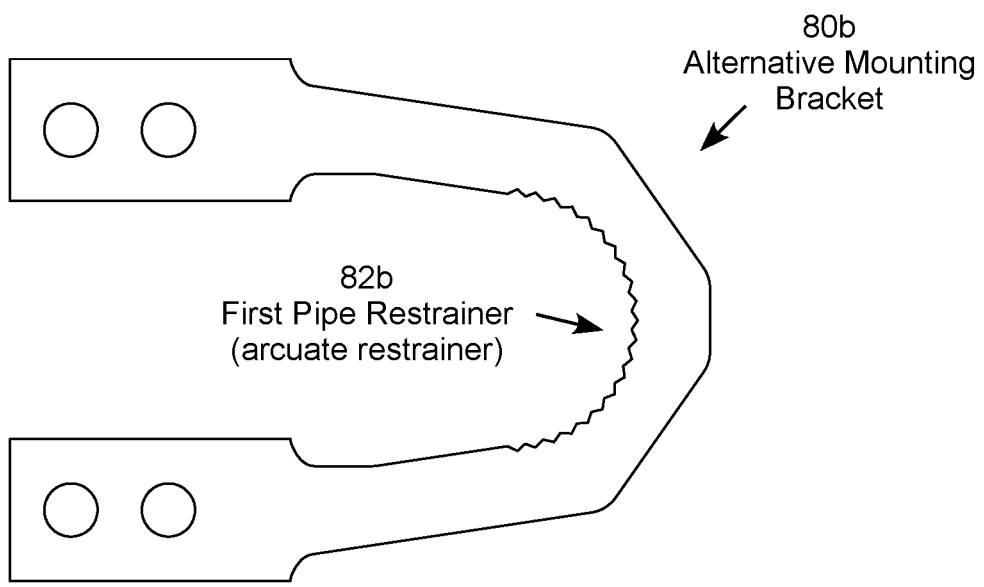
FIG. 8B is a top view of another alternative mounting bracket.

FIG. 8A is a top view of an alternative mounting bracket 80*a*. The alternative mounting bracket 80*a* is identical to the mounting bracket 100 shown in FIG. 5, except the shape of the first pipe restrainer 102 has been changed. Specifically, the vertex restrainer "V" shape of first pipe restrainer 102 of the mounting bracket 100 shown in FIG. 5 has been replaced by the arcuate restrainer shape of the first pipe restrainer 82*a* of the alternate mounting bracket 80*a* shown in FIG. 8A. In this alternative embodiment, the diameter of the arcuate restrainer should correspond to the diameter of the first pipe the alternative mounting bracket 80*a* is intended to receive. While this limits the versatility of the alternative mounting bracket 80*a* to a single pipe diameter, it is one of many potential alternative embodiments of the present invention as the edge contact surface of the first pipe restrainer is not limited to the specific shapes shown in the depicted embodiments. In other alternative embodiments, for example, the first pipe restrainer may have a serrated edge, a plastic coated edge, a plastic sleeve covering the edge, a low-PIM gasket positioned between the edge contact surface and the pipe, or any other desired edge contact surface. For example, FIG. 8B shows another alternative mounting bracket 80b with a serrated first pipe restrainer 82b.

Figure 9A:
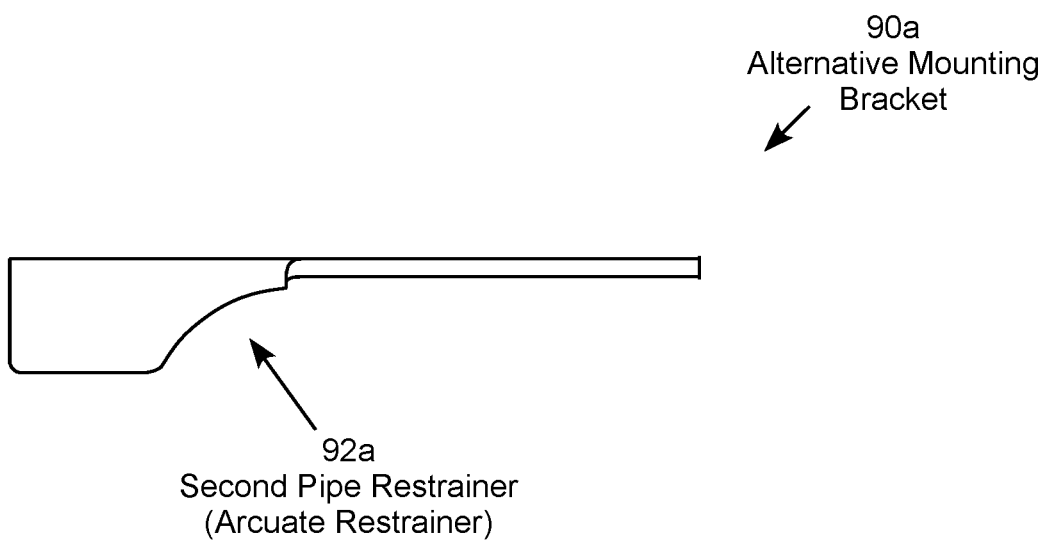
FIG. 9A is a side view of another alternative mounting bracket.
Figure 9B:
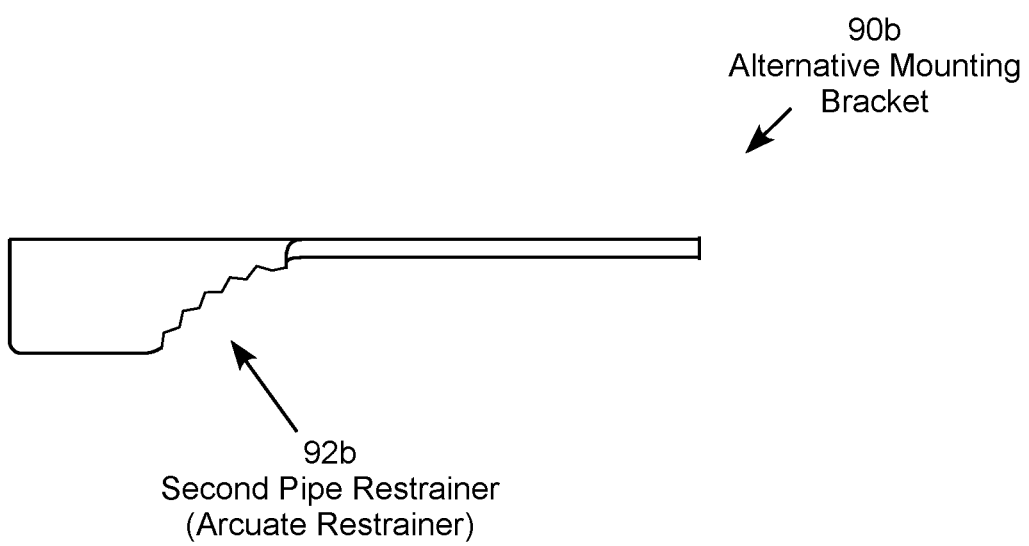
FIG. 9B is a side view of another alternative mounting bracket.

FIG. 9A is a side view of another alternative mounting bracket 90a. The alternative mounting bracket 90a is identical to the mounting bracket (upper) 100 shown in FIG. 6, except the shape of the second pipe restrainer 104 has been changed. Specifically, the wedge restrainer shape of first pipe restrainer 104 of the upper mounting bracket 100 shown in FIG. 6 has been replaced by the arcuate restrainer shape of the second pipe restrainer 92a of the alternate mounting bracket 90a shown in FIG. 9A. In this alternative embodiment, the diameter of the arcuate restrainer should correspond to the diameter of the second pipe the alternative mounting bracket 90a is intended to receive. While this limits the versatility of the alternative mounting bracket 90a to a single pipe diameter, it is another alternative embodiment of the present invention. Here again, the edge contact surface of the second pipe restrainer is not limited to the specific shapes shown in the depicted embodiments. Similar to the first pipe restrainer, for example, the second pipe restrainer may have a serrated edge, a plastic coated edge, a plastic sleeve covering the edge, a low-PIM gasket positioned between the edge contact surface and the pipe, or any other desired edge contact surface. For example, FIG. 9B shows another alternative mounting bracket 90b with a serrated first pipe restrainer 92b.

Figure 10:
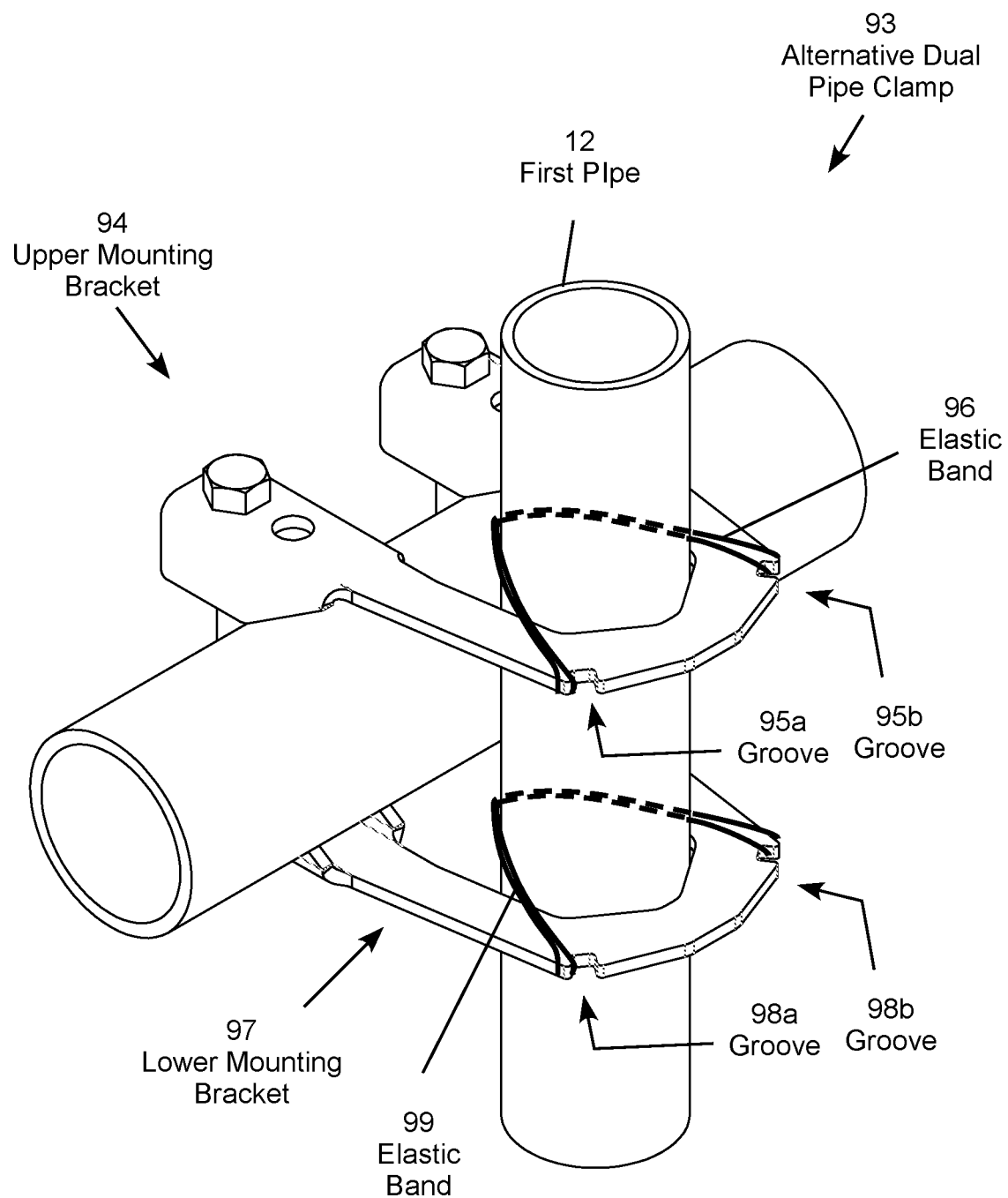
FIG. 10 is a perspective view of an alternative dual pipe clamp.

FIG. 10 is a perspective view of an alternative dual pipe clamp 93. The alternative dual pipe clamp 93 is identical to the dual pipe clamp 10 shown in FIG. 1, except that the upper mounting bracket 94 includes grooves 95a and 95b supporting an elastic band 96 used to temporarily attach the upper mounting bracket 94 to the first pipe 12. Similarly, the lower mounting bracket 97 includes grooves 98a and 98b supporting an elastic band 99 used to temporarily attach the lower mounting bracket 97 to the first pipe 12. The elastic bands 96, 99 can be used to temporarily secure the upper and lower mounting brackets 94, 97 to the first pipe 12 so that the installer can have "hands-free" to position the second pipe and install compression hardware.

FIG. 11A is a top view of the alternative dual pipe clamp 93 securing the second pipe 13 to a smaller first pipe 12a, while FIG. 11B shows the alternative dual pipe clamp securing the second pipe 13 to a larger first pipe 12b. These figures illustrate the versatility of the alternative dual pipe clamp 93 in accommodating pipes having a range of diameters. These views also show the "V" shaped vertex pipe restrainer 83 including a pair of straight sections 84a, 84b of the shell edge in contact with the round pipes 12a and 12b. In addition to accommodating pipes with a range of diameters, this configuration produces well controlled, high-pressure, concentrated edge contact surfaces between the mounting bracket and the pipes, while avoiding the relatively long continuous contact surfaces characteristic U-bolt and other conventional pipe restrainers.

FIG. 12A is a side view of the alternative dual pipe clamp 93 securing the first pipe 12 to a smaller second pipe 13a, while FIG. 12B shows the alternative dual pipe clamp securing the first pipe 12 to a larger second pipe 13b. These figures further illustrate the versatility of the alternative dual pipe clamp 93 in accommodating pipes having a range of diameters. These views also show that the wedge restrainers 83a, 83b form straight sections of shell edge 85a, 85b in contact with the round pipes 13a and 13b. In addition to accommodating pipes with a range of diameters, this configuration produces well controlled, high-pressure, concentrated edge contact surfaces between the mounting bracket and the pipes, while avoiding the relatively long continuous contact surfaces characteristic U-bolt and other conventional pipe restrainers.

Figure 13A:
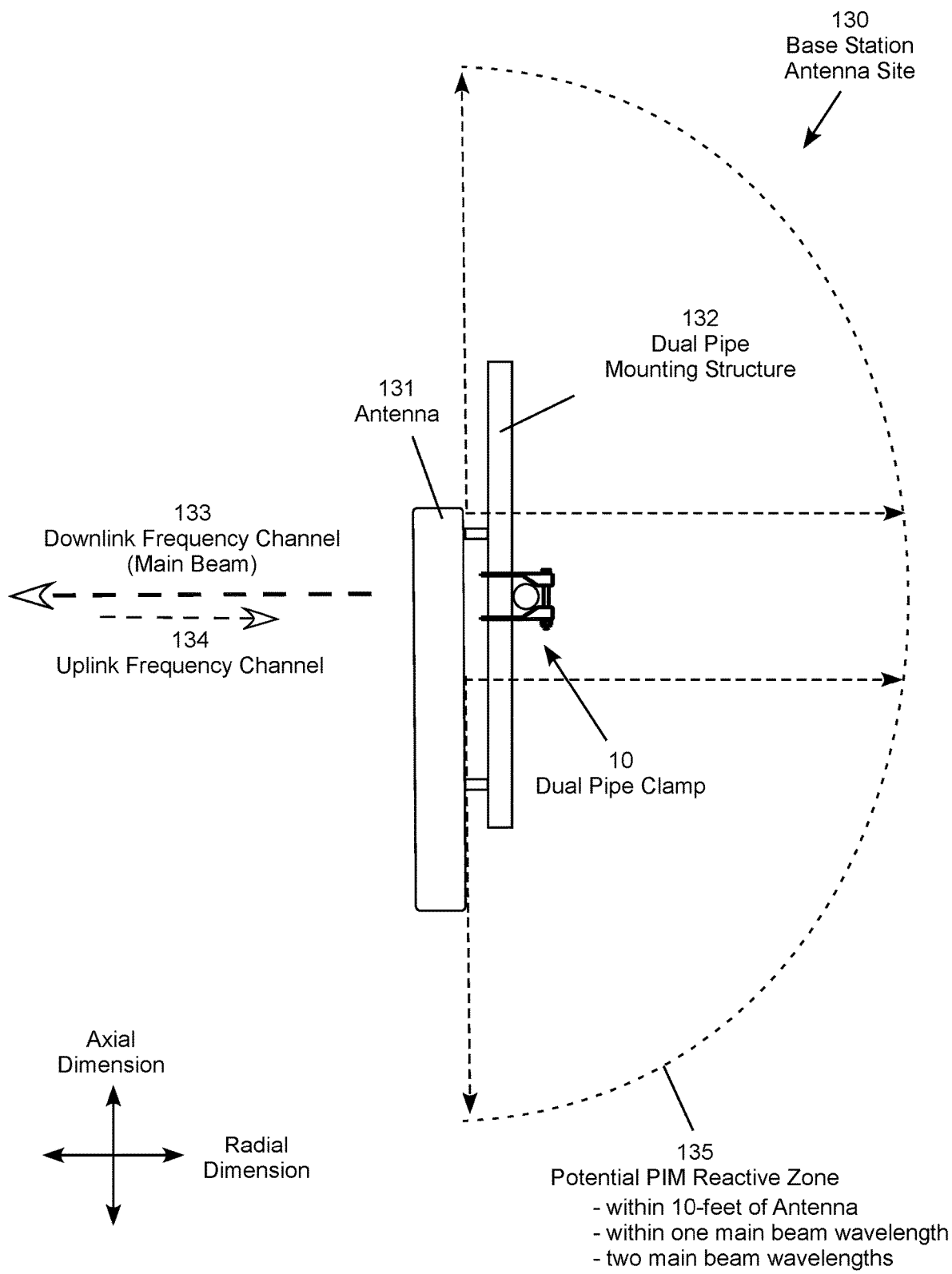
FIG. 13A is a conceptual side view of the dual pipe clamp positioned within a potential PIM reactive zone of a base station antenna.
Figure 13B:
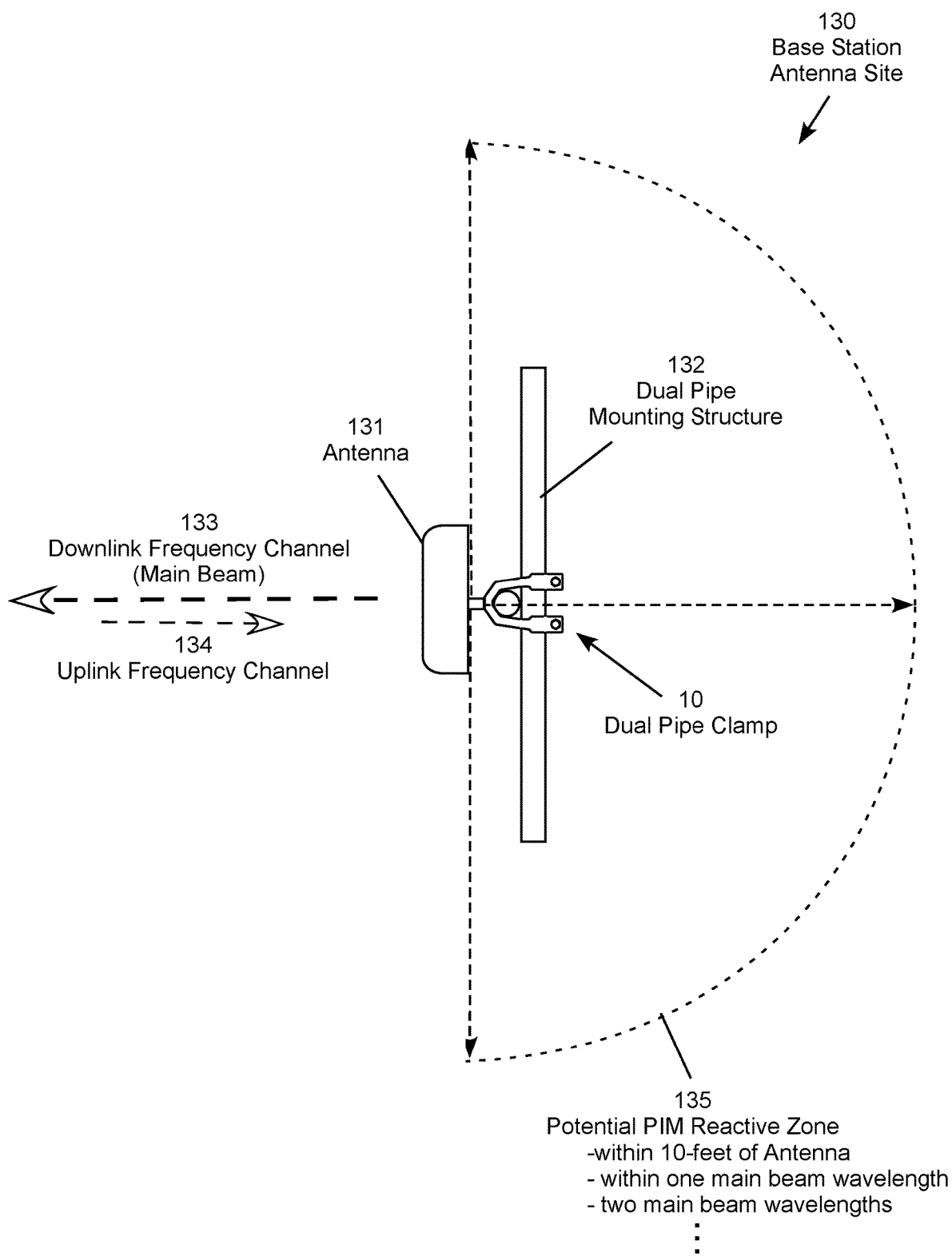
FIG. 13B is a conceptual top view of the dual pipe clamp positioned within a potential PIM reactive zone of a base station antenna.

To develop standards for mitigating PIM, technicians may define a potential PIM reactive zone 135 in which PIM mitigation equipment should be installed. FIGS. 13A-13B illustrate this practice for a representative example base station antenna site 130, in which the low-PIM dual pipe clamp 10 is attached to a dual pipe mounting structure 132 within a potential PIM reactive zone 135 defined for the antenna 131. In this example, the representative low-PIM dual pipe clamp 10 is located well outside the main beam 133 and physically behind the antenna 131 on the opposite side of the mounting structure 132 from the antenna. The low-PIM dual pipe clamp 10 is nevertheless specified to provide PIM mitigation because it is still located with the potential PIM reactive zone 135 defined for the antenna 131. The low-PIM dual pipe clamp 10 is representative the embodiments of the invention generally, as all of the embodiments described in the disclosure, and variations of these specific examples, are intended for deployment as PIM mitigation measures in the potential PIM reactive zones of cellular base station antennas.

While the low-PIM embodiments of the present invention can be utilized in any desired location, they are particularly effective for mitigating PIM interference when deployed in the potential PIM reactive zone 135 near the base station antenna 131. Although PIM generation is a function of the antenna broadcast frequency and power, technicians may use a standard distance, such as 10-feet from the antenna 131, to establish the potential PIM reactive zone 135 where PIM mitigation is appropriate. As other options, the potential PIM reactive zone 135 may be established to be a function of the antenna broadcast frequency, such as one or two wavelengths of the downlink frequency channel 133 of the antenna 131. Other factors, such as the broadcast power of the antenna 131, the presence of reflective surfaces in the physical environment of the antenna, the width of the uplink frequency channel 134, the use of electronic filtering, and other relevant factors may also be taken into account when establishing the potential PIM reactive zone for a particular antenna. For administrative simplicity, however, the size of a PIM reactive zone 135 may ultimately be defined to be a set distance, such as 10-feet from the antenna.

Figure 14:
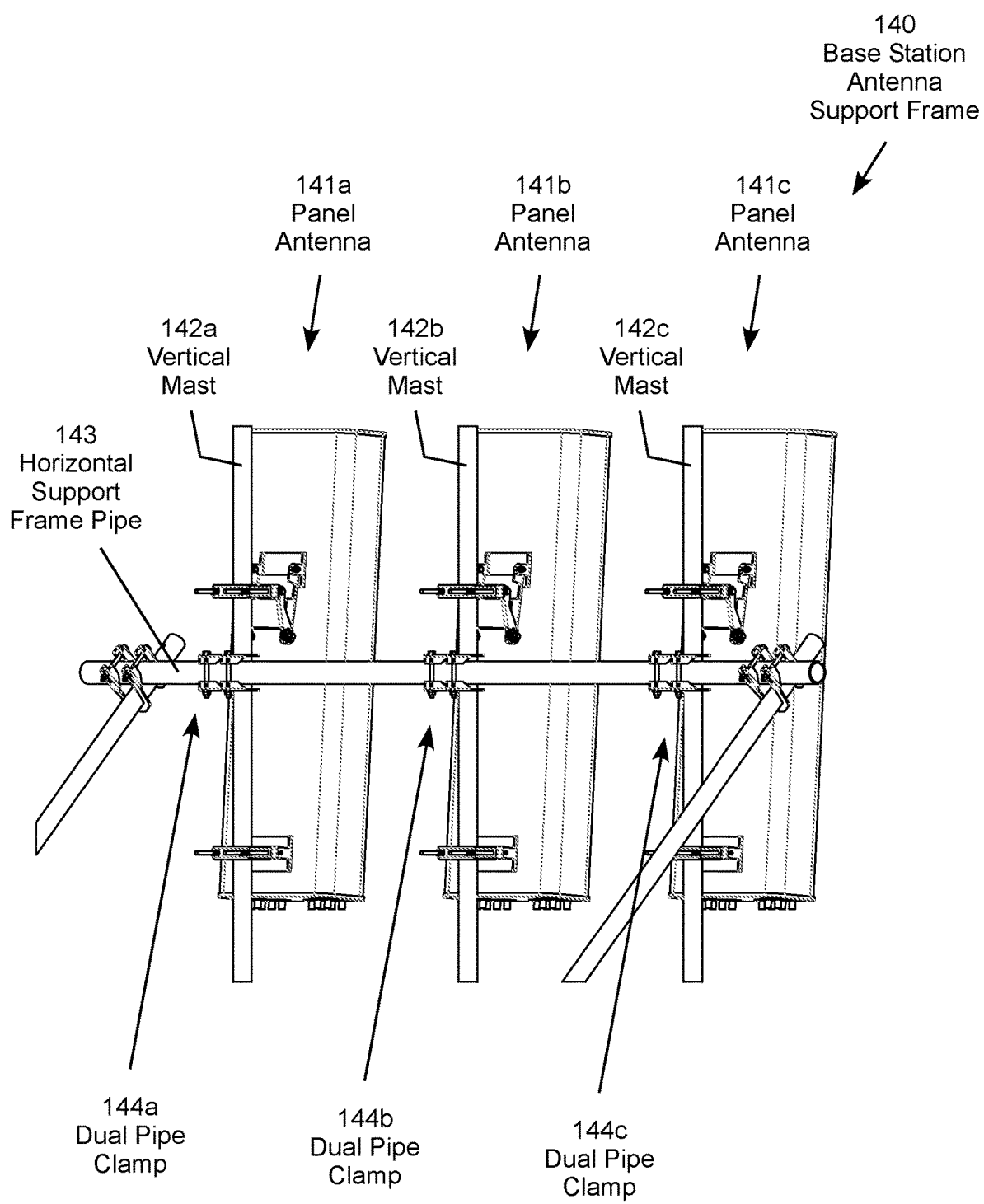
FIG. 14 is a perspective view of a base station antenna support frame utilizing dual pipe clamps.

FIG. 14 is a perspective view of an example base station antenna support frame 140 including three panel antennas 141a-141c supported by respective vertical masts 142a-142c. The vertical masts are supported by a horizontal support frame pipe 143. Three dual pipe clamps 144a-144c attach the vertical masts 142a-142c, respectively, to the horizontal support pipe 143 within the PIM-reactive zones of the panel antennas. While this is a representative embodiment showing a typical antenna mount configuration utilizing the dual pipe clamps, they can be deployed in any other suitable arrangement to secure a first pipe transverse to a second pipe.

Although particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A low-PIM dual pipe clamp for securing a first pipe transverse to a second pipe, comprising:
   an upper mounting bracket comprising an upper first pipe restrainer and an upper second pipe restrainer;
   a lower mounting bracket comprising a lower first pipe restrainer and a lower second pipe restrainer;
   a first threaded rod fastener connecting the upper mounting bracket to the lower mounting bracket;
   a second threaded rod fastener connecting the upper mounting bracket to the lower mounting bracket;
   wherein tightening the first and second threaded rod fasteners causes the upper first pipe restrainer and the lower first pipe restrainer to bias the first pipe against the second pipe; and
   wherein tightening the first and second threaded rod fasteners further causes the upper second pipe restrainer and the lower second pipe restrainer to bias the second pipe against the first pipe.

2. The low-PIM dual pipe clamp of claim 1, wherein:
   the upper first pipe restrainer comprises a vertex shape for biasing the first pipe against the second pipe;
   the lower first pipe restrainer comprises a vertex shape for biasing the first pipe against the second pipe.

3. The low-PIM dual pipe clamp of claim 1, wherein:
   the upper first pipe restrainer comprises an arcuate shape for biasing the first pipe against the second pipe;
   the lower first pipe restrainer comprises an arcuate shape for biasing the first pipe against the second pipe.

4. The low-PIM dual pipe clamp of claim 1, wherein:
   the upper second pipe restrainer comprises a wedge shape for biasing the second pipe against the first pipe;
   the lower second pipe restrainer comprises a wedge shape for biasing the second pipe against the first pipe.

5. The low-PIM dual pipe clamp of claim 1, wherein:
   the upper second pipe restrainer comprises an arcuate shape for biasing the second pipe against the first pipe;
   the lower second pipe restrainer comprises an arcuate shape for biasing the second pipe against the first pipe.

6. The low-PIM dual pipe clamp of claim 1, wherein the upper and lower first pipe restrainers are configured to accommodate first pipes with a range of diameters.

7. The low-PIM dual pipe clamp of claim 1, wherein the upper and lower second pipe restrainers are configured to accommodate second pipes with a range of diameters.

8. The low-PIM dual pipe clamp of claim 1, wherein:
   the upper first pipe restrainer is oriented transverse to the upper second pipe restrainer; and
   the lower first pipe restrainer is oriented transverse to the lower second pipe restrainer.

9. The low-PIM dual pipe clamp of claim 1, wherein the upper and lower mounting brackets are formed from stamped sheet metal.

10. The low-PIM dual pipe clamp of claim 1, wherein:
    the upper and lower mounting brackets are identical; and
    the first and second threaded rod fasteners are identical.

11. The low-PIM dual pipe clamp of claim 1, wherein:
    the upper mounting bracket is formed from a shell surrounded by a shell edge;
    the upper and lower first pipe restrainers are formed along the shell edge.

12. The low-PIM dual pipe clamp of claim 1, wherein:
    the lower mounting bracket is formed from a shell surrounded by a shell edge;
    the lower and lower first pipe restrainers are formed along the shell edge.

13. The low-PIM dual pipe clamp of claim 1, wherein the upper and lower mounting brackets each include grooves for supporting elastic bands for temporarily securing the upper and lower mounting brackets to the first pipe.

14. The low-PIM dual pipe clamp of claim 1, wherein the upper and lower mounting brackets are located within a PIM reactive zone of a cellular base station antenna.

15. A mounting bracket for a low-PIM dual pipe clamp, comprising:
    a horseshoe-shaped shell body defining a periphery;
    a shell edge around the periphery of the shell body;
    wherein the shell body comprises an inner foot, which is connected to an inner leg, which is connected to an arched section, which is connected to an outer leg, which is connected to an outer foot;
    wherein the shell edge along the arched section defines a first pipe restrainer for engaging a first pipe elongated in an axial direction;
    wherein the shell edge along the inner foot defines an inner second pipe restrainer for engaging a second pipe oriented transverse to the axial direction in contact with the first pipe;
    wherein the shell edge along the outer foot defines an outer second pipe restrainer for engaging the second pipe in contact with the first pipe.

16. The mounting bracket of claim 15, wherein:
    the inner foot comprises a first U-shaped foot section transverse to the first pipe restrainer forming the inner second pipe restrainer;
    the outer foot comprises a second U-shaped foot section transverse to the first pipe restrainer forming the outer second pipe restrainer.

17. The mounting bracket of claim 15, wherein:
    the first foot further comprises a first fastener hole for receiving a first fastened elongated in the axial direction and the second foot comprises a second fastener hole for receiving a second fastened elongated in the axial direction;
    the first fastener hole is spaced apart from the second fastener hole transverse to the axial direction;
    the first pipe restrainer and the second pipe restrainer position the first pipe for tightening against the second pipe as the first and second fasteners bias the mounting bracket in the axial direction.

18. The mounting bracket of claim 15, wherein the inner and outer second pipe restrainers each comprise a wedge shape, and the first pipe restrainer comprises a vertex shape.

19. The mounting bracket of claim 15, further comprising grooves for supporting elastic bands for temporarily securing the mounting bracket to the first pipe.

20. The mounting bracket of claim 15, wherein the shell body is located within a PIM reactive zone of a cellular base station antenna.

* * * * *